(12) United States Patent
Corey

(10) Patent No.: US 11,377,208 B2
(45) Date of Patent: Jul. 5, 2022

(54) SYSTEMS AND METHODS FOR A VEHICLE-COMPATIBLE DRONE

(71) Applicant: Honda Motor Co., Ltd., Tokyo (JP)

(72) Inventor: Peter Douglas Corey, Redondo Beach, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 356 days.

(21) Appl. No.: 16/542,419

(22) Filed: Aug. 16, 2019

(65) Prior Publication Data

US 2021/0047030 A1 Feb. 18, 2021

(51) Int. Cl.
*B64C 27/50* (2006.01)
*B64C 39/02* (2006.01)
*G05D 1/10* (2006.01)
*G05D 1/12* (2006.01)

(52) U.S. Cl.
CPC ............ *B64C 27/50* (2013.01); *B64C 39/024* (2013.01); *G05D 1/106* (2019.05); *G05D 1/12* (2013.01); *B64C 2201/027* (2013.01); *B64C 2201/122* (2013.01); *B64C 2201/141* (2013.01); *B64C 2201/18* (2013.01)

(58) Field of Classification Search
CPC . B64C 27/50; B64C 39/024; B64C 2201/027; B64C 2201/122; B64C 2201/141; B64C 2201/18; G05D 1/106; G05D 1/12
See application file for complete search history.

(56) References Cited

U.S. PATENT DOCUMENTS

| 9,056,676 | B1 | 6/2015 | Wang |
| 9,573,683 | B2 | 2/2017 | Martin et al. |
| 2016/0304217 | A1 | 10/2016 | Fisher et al. |
| 2017/0075360 | A1* | 3/2017 | Von Novak ............ B64C 27/08 |

(Continued)

FOREIGN PATENT DOCUMENTS

| CN | 108583929 | 9/2018 |
| DE | 102014213023 | 1/2016 |

(Continued)

OTHER PUBLICATIONS

Air, Ural Motorcycles, 2018, pp. 1-10, Redmond, WA, https://www.imz-ural.com/limited-edition-air.

(Continued)

*Primary Examiner* — Thomas E Worden
(74) *Attorney, Agent, or Firm* — Rankin, Hill & Clark LLP

(57) ABSTRACT

Systems and methods for a vehicle-compatible drone. In one embodiment, a computer-implemented method includes providing a drone having a plurality of blades and an expansion device. The expansion device is adapted to reconfigure the position of at least one blade of the plurality of blades from a first configuration of the drone to a second configuration of the drone. The computer-implemented method also includes identifying the drone being in a first mode that is associated with the first configuration. The computer-implemented method further includes detecting a trigger signal based on an event. The computer-implemented method includes transmitting a transition signal configured to cause the drone to transition to the second mode that is associated with the second configuration.

18 Claims, 6 Drawing Sheets

(56) References Cited

U.S. PATENT DOCUMENTS

| | | | | |
|---|---|---|---|---|
| 2018/0090013 A1* | 3/2018 | Park | ............ | B64C 39/024 |
| 2018/0141658 A1* | 5/2018 | Baur | ............ | B60R 1/00 |
| 2018/0319494 A1* | 11/2018 | Aflatoon | ............ | B60L 53/12 |
| 2018/0354417 A1 | 12/2018 | Parissi | | |
| 2019/0009756 A1 | 1/2019 | Jacobs | | |
| 2019/0047697 A1* | 2/2019 | Kulkarni | ............ | G06F 1/1677 |
| 2019/0047699 A1* | 2/2019 | Bonden | ............ | H01M 10/625 |
| 2019/0291864 A1* | 9/2019 | Liu | ............ | G03B 17/561 |
| 2019/0392716 A1* | 12/2019 | Lu | ............ | H04W 4/027 |

FOREIGN PATENT DOCUMENTS

| | | |
|---|---|---|
| FR | 2986647 | 8/2013 |
| WO | 2018140050 | 8/2018 |

OTHER PUBLICATIONS

Dan Cunnigham, Net Guard drone rescues people from highrise fire emergencies, Design Boom, Nov. 7, 2018, pp. 1-13, https://www.designboom.com/technology/net-guard-drone-11-7-2018/.

* cited by examiner

SYSTEMS AND METHODS FOR A VEHICLE-COMPATIBLE DRONE

BACKGROUND

A drone, also known as an unmanned aerial vehicle (UAV), remotely piloted aerial vehicle (RPAV), remotely piloted aircraft system (RPAS), or unmanned aircraft system (UAS), is an aircraft without a human pilot. Specifically, the drone may be piloted remotely through software-controlled flight plans that may be onboard or remotely accessed. Drones have gotten much smaller since the turn of the century. The smaller size of a drone can facilitate use and storage of the drone. However, the smaller overall size of drones can also lead to instability during flight. For example, a drone with a multi-blade setup may be capable of both a vertical takeoff and hovering in calm conditions, but be unstable in wind.

BRIEF DESCRIPTION

According to one aspect, a computer-implemented method for a vehicle-compatible drone. The computer-implemented method includes providing a drone having a plurality of blades and an expansion device. The expansion device is adapted to reconfigure the position of at least one blade of the plurality of blades from a first configuration of the drone to a second configuration of the drone. The computer-implemented method also includes identifying the drone being in a first mode that is associated with the first configuration. The computer-implemented method further includes detecting a trigger signal based on an event. The computer-implemented method yet further includes transmitting a transition signal configured to cause the drone to transition to the second mode that is associated with the second configuration.

According to another aspect, a vehicle-compatible drone includes a plurality of blades and an expansion device adapted to reconfigure the position of at least one blade of the plurality of blades from a first configuration of the drone to a second configuration of the drone. The vehicle-compatible drone also includes a memory storing instructions when executed by a processor cause the processor to perform a method. The method includes identifying the drone being in a first mode. The first mode is associated with the first configuration. The method also includes detecting a trigger signal based on an event. The method further includes transmitting a transition signal configured to cause the drone to transition to the second mode that is associated with the second configuration.

According to still another aspect, a non-transitory computer readable storage medium stores instructions that, when executed by a computer, which includes at least a processor, causes the computer to perform a method for a vehicle compatible drone. The method includes providing a drone having a plurality of blades and an expansion device. The expansion device is adapted to reconfigure the position of at least one blade of the plurality of blades from a first configuration of the drone to a second configuration of the drone. The method also includes identifying the drone being in a first mode that is associated with the first configuration. The method further includes detecting a trigger signal based on an event. The method includes transmitting a transition signal configured to cause the drone to transition to the second mode that is associated with the second configuration.

BRIEF DESCRIPTION OF THE DRAWINGS

FIG. 4A is a model representation of the drone in an expanded configuration according to an exemplary embodiment.

DETAILED DESCRIPTION

Figure 1:
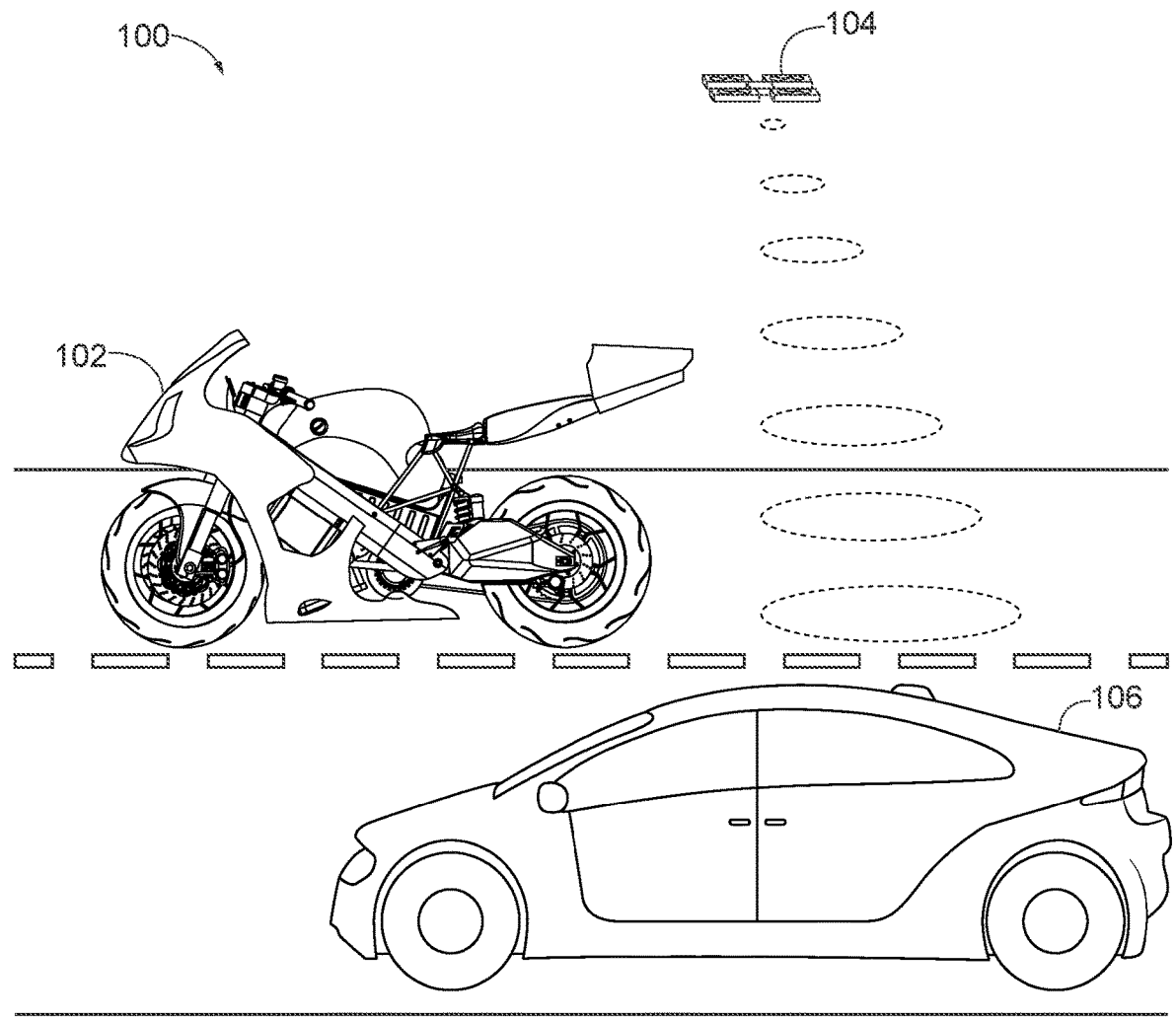
FIG. 1 is a schematic diagram of a use environment for implementing systems and methods for a vehicle-compatible drone according to an exemplary embodiment.

As discussed above, the trade-off to reducing the overall size of a drone, is that the smaller the drone, the more unstable the drone becomes when it encounters weather conditions, such as wind. However, the smaller size of a drone may be more conducive to these uses and storage of the drone. Therefore, based on the desired size of the drone may vary based on what is being done with the drone. For example, when the drone is in use a larger overall size may promote stability, while a drone with a smaller overall size may be desired when the drone is not in flight.

The systems and methods described herein are directed to a vehicle-compatible drone having expandable blades and an expansion device. The blades function with rotors to turn the blades and provide the drone with lift so that the drone is capable of flight. The expansion device allows at least one of the blades to expand from a center point of the drone thereby increasing the radial length of the drone in at least one direction in an expanded configuration. In the expanded configuration the size of the drone is larger in that direction as compared to the size of the drone in a retracted configuration.

Furthermore, the expanded configuration and the retracted configuration correspond to different modes, such as a flight mode and an onboard mode, respectively. The drone may provide different functionality based on the mode. For example, in the flight mode, the drone may be in the expanded configuration to perform monitoring of a physical environment while in flight. Likewise, in the onboard mode, the drone may be in the retracted configuration to perform cooling for a vehicle. Therefore, the size of the drone can be tailored to the functionality of the drone.

Definitions

The following includes definitions of selected terms employed herein. The definitions include various examples and/or forms of components that fall within the scope of a term and that can be used for implementation. The examples are not intended to be limiting. Furthermore, the components discussed herein, can be combined, omitted, or organized with other components or into different architectures.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication," as used herein, refers to a communication between two or more communicating devices (e.g., computer, personal digital assistant, cellular telephone, network device, vehicle, vehicle computing device, infrastructure device, roadside equipment) and can be, for example, a network transfer, a data transfer, a file transfer, an applet transfer, an email, a hypertext transfer protocol (HTTP) transfer, and so on. A computer communication can occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication can utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface" as used herein can include input and/or output devices for receiving input and/or devices for outputting data. The input and/or output can be for controlling different vehicle features, which include various vehicle components, systems, and subsystems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface, which can be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Database," as used herein, is used to refer to a table. In other examples, "database" can be used to refer to a set of tables. In still other examples, "database" can refer to a set of data stores and methods for accessing and/or manipulating those data stores. A database can be stored, for example, at a disk, data store, and/or a memory.

"Data store," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Display," as used herein can include, but is not limited to, LED display panels, LCD display panels, CRT display, plasma display panels, touch screen displays, among others, that are often found in vehicles to display information about the vehicle. The display can receive input (e.g., touch input, keyboard input, input from various other input devices, etc.) from a user. The display can be accessible through various devices, for example, though a remote system. The display may also be physically located on a portable device, mobility device, or vehicle.

"Drone system," as used herein can include, but is not limited to, any automatic or manual systems that can be used to enhance the drone, vehicle, driving, piloting, and/or safety. Exemplary drone systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a steering system, a transmission system, brake pedal systems, an electronic power steering system, visual devices (e.g., camera systems, proximity sensor systems), a climate control system, an electronic pretensioning system, a monitoring system, a sensory system, an interior or exterior camera system among others.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DR-RAM). The memory can store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action (s), and/or to cause a function or action from another module, method, and/or system. A module can also include logic, a software-controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Operable connection," or a connection by which entities are "operably connected," is one in which signals, physical communications, and/or logical communications can be sent and/or received. An operable connection can include a wireless interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

"Vehicle," as used herein, refers to any moving vehicle that is capable of carrying one or more users and is powered by any form of energy. The term "vehicle" includes, but is not limited to, cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is powered entirely or partially by one or more electric motors powered by an electric battery. The EV can include battery electric vehicles (BEV), plug-in hybrid electric vehicles (PHEV), and extended range electric vehicles (EREVs). The term "vehicle" can also refer to an autonomous vehicle and/or self-driving vehicle powered by any form of energy. The autonomous vehicle can carry one or more users. Further, the term "vehicle" can include vehicles that are automated or non-automated with pre-determined paths or free-moving vehicles.

A "vehicle occupant," as used herein can include, but is not limited to, one or more biological beings located in the vehicle. The vehicle occupant can be a driver or a passenger of the vehicle. The vehicle occupant may also be a pilot of the drone.

I. System Overview

Referring now to the drawings, the showings are for purposes of illustrating one or more exemplary embodiments and not for purposes of limiting the same. FIG. 1 is a schematic view of an exemplary traffic scenario 100. The traffic scenario 100 can include any type of path, road, highway, freeway, or travel route. The traffic scenario 100 can have various configurations not shown in FIG. 1. For example, the traffic scenario 100 can have any number of lanes or use any number of paths. The traffic scenario 100 are traversed by one or more vehicles, such as a host vehicle 102 that is compatible with a drone 104. The one or more vehicles of the traffic scenario 100 may also include one or more remote vehicles, such as a remote vehicle 106.

In FIG. 1, the traffic scenario 100 illustrate an example physical environment of the host vehicle 102 and the drone 104. As will be discussed in greater detail below, the host vehicle 102 and the drone 104 may work together to enhance the operation of the host vehicle 102. For example, the drone 104 may deliver items, such as battery packs to the host vehicle 102 and/or providing additional monitoring to the host vehicle 102, provide increased communication capability, and/or contact emergency services. The drone 104 may also enhance specific systems of the host vehicle 102, for example, by providing cooling for the host vehicle 102.

Figure 2:
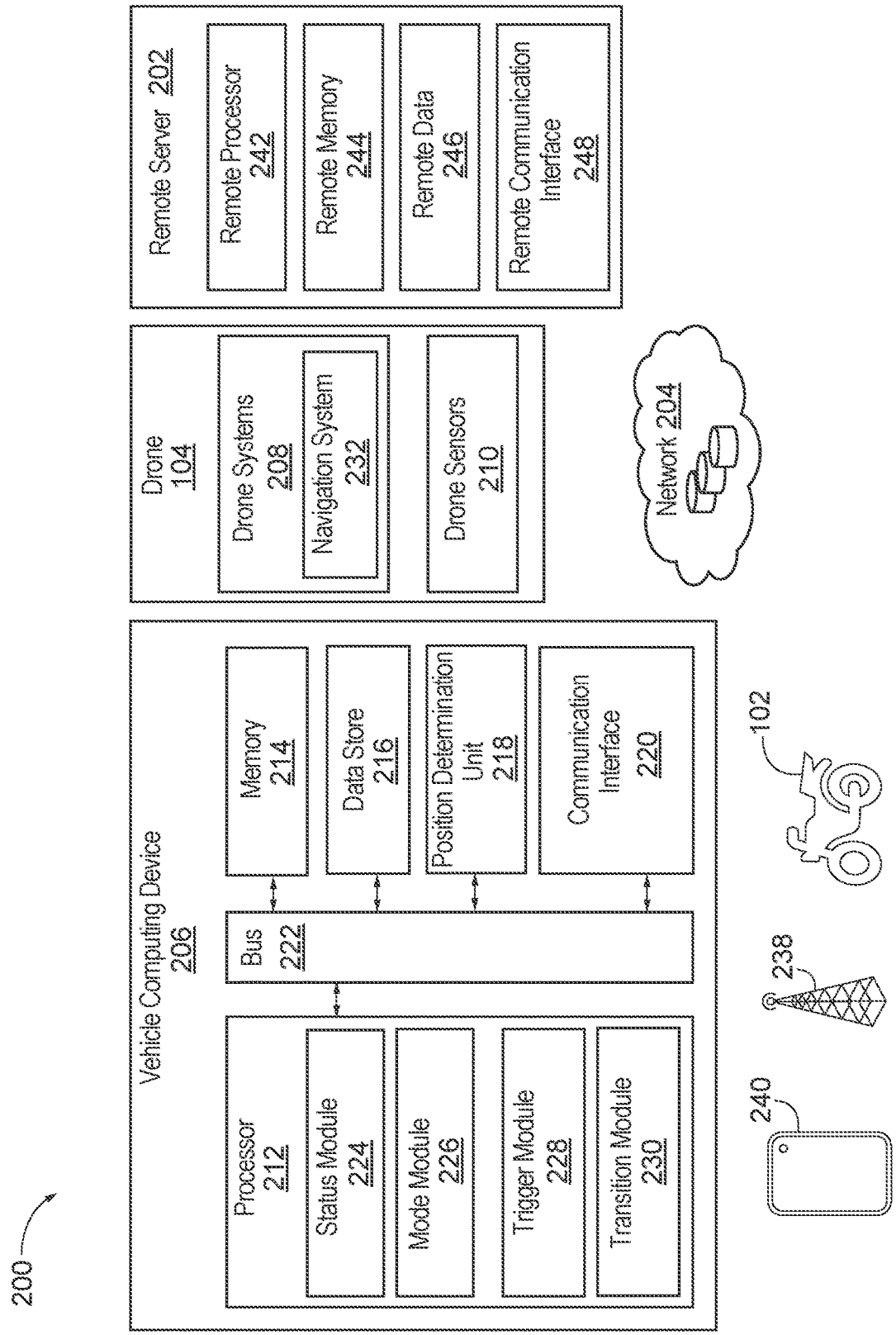
FIG. 2 is a block diagram of an operating environment for a vehicle-compatible according to an exemplary embodiment.

The cooperation of the host vehicle 102 and the drone 104 may be facilitated by an operating environment, such as operating environment 200 of FIG. 2. FIG. 2, a block diagram of the operating environment 200 for the drone 104 is host vehicle 102 compatible. One or more of the components of the operating environment 200 can be considered in whole or in part a vehicle communication network. The host vehicle 102 communicates with the drone 104, the remote vehicle 106, and/or a remote server 202 over a network 204. A vehicle computing device (VCD) 206 may be provided at the host vehicle 102, the drone 104, the remote server 202, or other remote location operably connected to the host vehicle 102, the drone 104 and/or the remote server 202 via the network 204. Drone systems 208 and drone sensors 210 communicate information about entities in the traffic scenario 100 such as the host vehicle 102, the drone 104, the remote vehicle 106, etc. to the VCD 206.

Generally, the VCD 206 includes a processor 212, a memory 214, a data store 216, a position determination unit 218, and a communication interface 220, which are each operably connected for computer communication via a bus 222 and/or other wired and wireless technologies defined herein. The VCD 206, can include provisions for processing, communicating, and interacting with various components of the host vehicle 102 and other components of the operating environment 200. In one embodiment, the VCD 206 can be implemented with the host vehicle 102, for example, as part of a telematics unit, a head unit, an infotainment unit, an electronic control unit, an on-board unit, or as part of a specific vehicle control system, among others. In other embodiments, the VCD 206 can be implemented remotely from the host vehicle 102 or the drone 104, for example, with a portable device 240 or the remote server 202, connected via the network 204.

The processor 212 can include logic circuitry with hardware, firmware, and software architecture frameworks. In some embodiments, the processor 212 can store application frameworks, kernels, libraries, drivers, application program interfaces, among others, to execute and control hardware and functions discussed herein. For example, the processor 212 can include a status module 224, a mode module 226, a trigger module 228, and a transition module 230, although it is understood that the processor 212 can be configured into other architectures.

The memory 214 and/or the data store 216 may store data about the host vehicle 102 and/or the drone 104, such as sensor data from the drone sensors 210. Further, in some embodiments, the memory 214 and/or the data store 216 can store similar components as the processor 212 for execution by the processor 212. The modules of the processor 212 may access the position determination unit 218 via the bus 222. The position determination unit 218 can include hardware (e.g., sensors) and software to determine and/or acquire position data about the host vehicle 102 and/or the drone 104. For example, the position determination unit 218 can include a global positioning system (GPS) unit (not shown) and/or an inertial measurement unit (IMU) (not shown). Thus, the position determination unit 218 can provide a geo-position of the host vehicle 102 and/or the drone 104 based on satellite data from, for example, a global position source (not shown), or from any Global Navigational Satellite infrastructure (GNSS), including GPS, Glonass (Russian) and/or Galileo (European). Further, the position determination unit 218 can provide dead-reckoning data or motion data from, for example, a gyroscope, accelerometer, magnetometers, among other drone sensors 210. In some embodiments, the position determination unit 218 can be a component of the flight system 232 of the drone systems 208 that provides navigation maps and navigation information to the host vehicle 102 and/or the drone 104.

The communication interface 220 can include software and hardware to facilitate data input and output between the components of the VCD 206 and other components of the operating environment 200. Specifically, the communication interface 220 can include network interface controllers (not shown) and other hardware and software that manages and/or monitors connections and controls bi-directional data transfer between the communication interface 220 and other components of the operating environment 200 using, for example, the network 204. More specifically, in one embodiment, the VCD 206 can exchange data and/or transmit data, such as the sensor data, with other operably connected devices or other communication hardware and protocols. In some embodiments, the host vehicle 102 and/or the drone 104 can also exchange data (e.g., sensor data as will be described herein) over remote networks by utilizing a wireless network antenna, roadside equipment 238, the portable device 240, and/or the network 204 (e.g., a wireless communication network), or other wireless network connections.

Referring again to the drone 104, the drone systems 208 can include any type of drone control system and/or vehicle described herein to enhance the host vehicle 102 and/or driving of the host vehicle 102. For example, the drone systems 208 can include autonomous piloting systems, remote control systems, driver-assist systems, adaptive cruise control systems, docking systems, or any other advanced driving assistance systems (ADAS). Here, the drone systems 208 may include a flight system 232. The flight system 232 stores, calculates, and provides route and destination information and facilitates features like guidance systems.

The drone sensors 210, which can be implemented with the drone systems 208, can include various types of sensors for use with the host vehicle 102 and/or the drone systems 208 for detecting and/or sensing a parameter of the host vehicle 102, the drone systems 208, and/or the traffic scenario 100 of the host vehicle 102 and the drone 104. For example, the drone sensors 210 can provide data about vehicles and/or downstream objects in proximity to the host vehicle 102 and/or the drone 104. For example, the drone sensors 210 can include, but are not limited to: acceleration sensors, speed sensors, braking sensors, proximity sensors, vision sensors, ranging sensors, seat sensors, seat-belt sensors, door sensors, environmental sensors, yaw rate sensors, steering sensors, GPS sensors, among others. It is also understood that the drone sensors 210 can be any type of sensor, for example, acoustic, electric, environmental, optical, imaging, light, pressure, force, moisture, thermal, temperature, proximity, among others.

Using the system and network configuration discussed above, a vehicle-compatible drone is provided. The host vehicle 102 works in conjunction with the drone 104 in multiple configurations based on the mode of the drone 104. Detailed embodiments describing exemplary methods using the system and network configuration discussed above will now be discussed in detail.

II. Methods Associated with a Vehicle Compatible Drone

Figure 3:
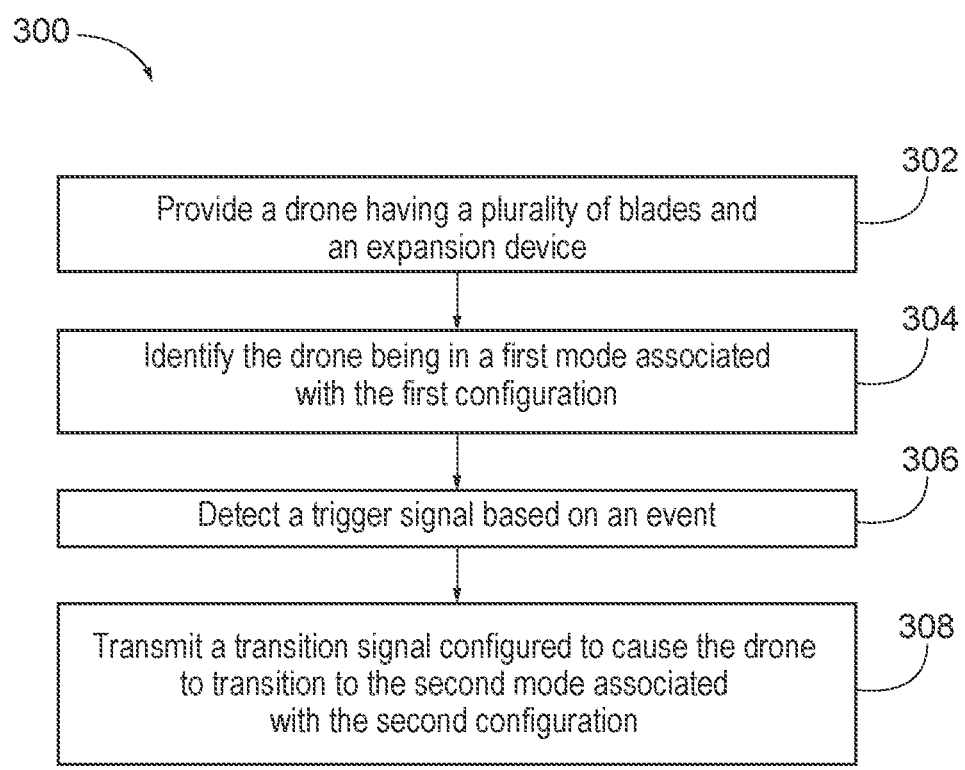
FIG. 3 is a process flow for releasing a vehicle-compatible drone according to an exemplary embodiment.

Referring now to FIG. 3, a method 300 for releasing a vehicle-compatible drone according to an exemplary embodiment is illustrated. FIG. 3 will also be described with reference to FIGS. 1, 2, 4, and 5. As shown in FIG. 3, the method 300 can be described by a number of steps. For simplicity, the method 300 will be described by these steps, but it is understood that the steps of the method 300 can be organized into different architectures, blocks, stages, and/or processes.

Figure 4B:
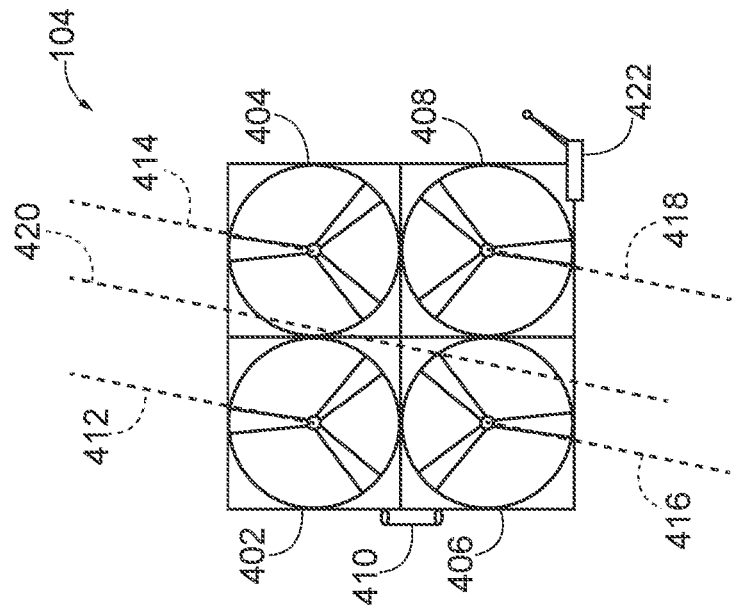
FIG. 4B is a model representation of the vehicle having a rear fairing in an open state according to an exemplary embodiment.
Figure 4A:
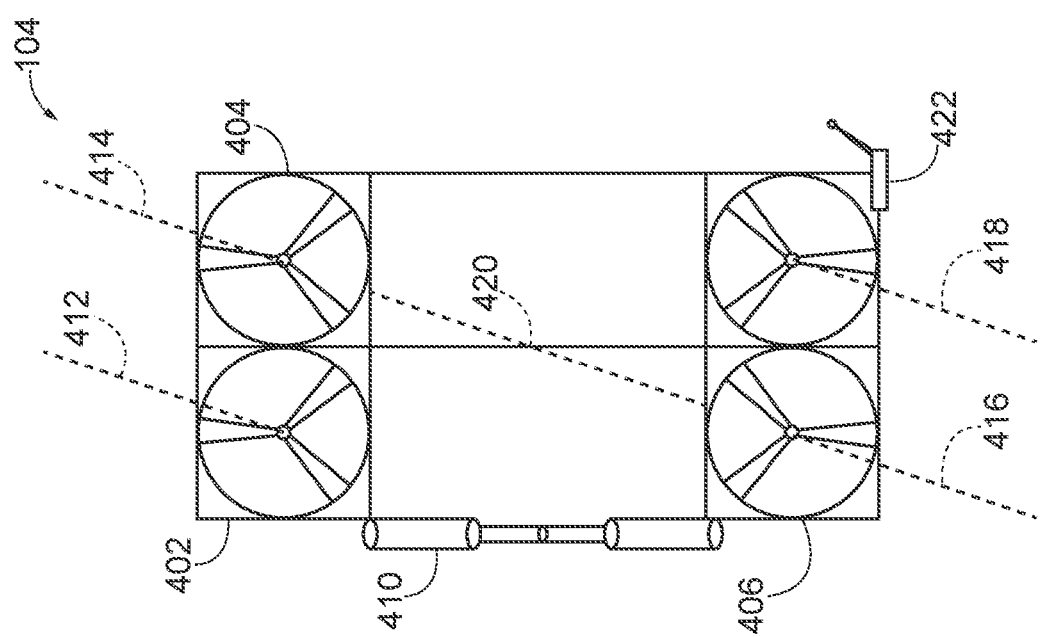
FIG. 4A is a model representation of the vehicle having a rear fairing in an open state according to an exemplary embodiment.

At step 302, the method 300 includes providing a drone 104 having a plurality of blades 402, 404, 406, and 408 and an expansion device 410 adapted to reconfigure the position of at least one blade of the plurality of blades 402-408 from a first configuration, as shown in FIG. 4A, to a second configuration, as shown in FIG. 4B. The plurality of blades 402-408 are a structures with a surface that rotate about a rotor axes to provide lift to the drone 104 during flight. For example, the blade structure 402 has a rotor axis 412, 404 has a rotor axis 414, 406 has a rotor axis 416, and 408 has a rotor axis 418.

In some embodiments, the plurality of blades 402-408 may be arranged around a central axis 420 of the drone 104. The central axis 420 is generally parallel to the rotor axes 412-418. For example, in the first configuration, at least one blade of the plurality of blades 402-408 is in an expanded position. Accordingly, as shown in FIG. 4A, the plurality of blades 402-408 move distance $d_1$ from the central axis 420 in the expanded position. In the second configuration, at least one blade of the plurality of blades 402-408 may in a retracted position. As shown in FIG. 4B, the plurality of blades 402-408 move distance $d_2$ from the central axis 420 in the retracted position. The distance $d_1$ is longer than the distance $d_2$.

The expansion device 410 facilitates lateral movement of the plurality of blades 402-408 in a direction generally orthogonal to the central axis. The expansion device 410 may include one or more of tracks adapted to slidably receive one or more of the plurality of blades 402-408, a linkage mechanism adapted to reconfigure the one or more of the plurality of blades 402-408, and an expansion mandrel, among others or a combination thereof.

In one embodiment, the expansion device 410 is adapted to selectively increase the distance between a rotor axis of one or more of the plurality of blades 402-408 and the central axis 420. According to one aspect, the expansion device 410 is an expansion mandrel adapted to selectively expand opposite blades of the plurality of blades 402-408 at end portions of the mandrel. The expansion mandrel may be configured to expand and adjust a shape of the drone 104 from a square shape in top view to a rectangle shape in top view when the drone 104 is in flight.

In some embodiments, the configuration of the drone 104 may be set based on the position of the expansion device. The setting of the expansion device 410 may be set by the status module 224. According to the aspect depicted in FIG. 4A, the expansion device 410 may also include at least one actuator (not shown) that is controlled by the drone systems 208 based on a command from the status module 224. As the drone systems 208 controls driving of the at least one actuator based on a command, the at least one actuator is driven to expand one of the end portions of the expansion mandrel and, in turn, one or more of the plurality of blades 402-408. Accordingly, the actuator may be controlled based on a command from the status module 224 to position the drone 104 in the first configuration or the second configuration.

Additionally or alternatively, the linkage mechanism of an exemplary expansion device 410 may include an elongated rod or axle configured and adapted to have mounted thereto sliders. The sliders provided nearest the end portions of the rod will be referred to as the outer sliders, and the sliders located laterally inwardly of the outer sliders will be referred to as the inner sliders. The outer and inner sliders allow for sliding movement of the sliders along a length of the rod while preventing rotational movement of the sliders about the rod. One or more of the plurality of blades 402-408 may move along the inner and outer slider in response to the actuator being controlled by the drone systems 208 based on a command from the status module 224. The status module 224 may also determine a status, such as an operation status, a configuration status, and a mode status, among others based on sensor data received from the host vehicle 102 and/or the drone 104.

The expansion device 410 facilitates one or more of the plurality of blades 402-408 moving independently from other blades of the plurality of blades 402-408. The expansion device 410 may also facilitate the plurality of blades 402-408 synchronously transitioning from the first configuration to the second configuration and from the second configuration to the first configuration. Thus, the drone 104 at step 302 of the method 300 can transition to and from multiple configurations by virtue of an expansion device 410.

At block 304, the method 300 includes the mode module 226 identifying the drone 104 being in a first mode that is associated with the first configuration. The first mode may be any one of numerous modes. For example, the first mode may be a flight mode in which the drone 104 is in flight. The first mode may be an onboard mode in which the drone 104 is onboard the host vehicle 102. The first mode may be a transition mode in which the drone is executing a docking procedure in order to land on the host vehicle 102 or a takeoff procedure in order to depart from the host vehicle 102 by taking flight. Like the first mode, a second mode may also describe the relationship of the drone 104 relative to the host vehicle 102. For example, the second mode, may be a flight mode, transition mode to or from the host vehicle 102, or an onboard mode. While a first mode and a second mode are described, the mode module 226 may also identify a third mode, fourth mode, and so on.

The drone 104 may confer different benefits to the host vehicle 102 based on the mode that the drone 104 is in. For example, in the flight mode, the drone 104 may monitor the traffic scenario 100 associated with the host vehicle 102. Suppose that the remote vehicle 106 is approaching the host vehicle 102, the drone sensors 210 may capture sensor data regarding the remote vehicle when the remote vehicle 106 is within a threshold distance of the host vehicle 102. The captured sensor data may be relayed directly to the host vehicle 102 and/or to the remote server 202. The remote processor 242 may process the sensor data and store the sensor data in a remote memory 244. Additionally or alternatively, the remote server 202 may analyze the sensor data and package the sensor data with remote data 246 and transmit the packaged sensor data and remote data 246 using the remote communication interface 248.

In one embodiment, the drone 104 may capture sensor data related to a collision event rendering the host vehicle 102 non-operational. If the host vehicle 102 is unable confirm receipt of the sensor data, the sensor data may be transmitted to the remote server 202. The remote server 202 may process the sensor data and compare the results to the remote data 246 and consequently determine that a collision event has occurred. Additionally or alternatively, the drone sensors 210 may capture physiological data associated with a vehicle occupant of the host vehicle 102. The drone 104 and/or the remote server 202 may contact emergency services for the host vehicle 102 and/or the vehicle occupant based on the sensor data. For example, the status module 224 may determine that the vehicle occupant is in distress based on sensor data from the drone sensors 210, the drone 104, the host vehicle 102, and/or the remote server 202 may contact emergency services.

In another embodiment, the drone 104 may extend the communications range of the host vehicle 102. In some embodiments, the drone 104 may include a range extender 422 shown in FIGS. 4A and 4B. Suppose that the host vehicle 102 communicates over remote networks by utilizing a wireless network antenna, roadside equipment 238, the portable device 240, and/or the network 204 (e.g., a wireless communication network), or other wireless network connections. The range extender 422 of the drone 104 may repeat the wireless signal from the host vehicle to expand the range of the host vehicle's communication. For example, suppose that the host vehicle 102 is unable to communicate with roadside equipment 238 due to the geographic terrain of traffic scenario 100. The VCD 206 and/or the drone 104 may receive an out-of-range alert associated with the host vehicle 102. In flight mode, the drone 104 may be deployed to a position from which the drone 104 can act as an intermediary between the roadside equipment 238 and the host vehicle 102 based on the out-of-range alert. The intermediary position may be defined as a position from which the drone can communicate with the roadside equipment 238 and the host vehicle 102 even if the roadside equipment 238 and the host vehicle 102 are unable to communicate with one another. From the intermediary position, the drone 104 may initialize the range extender 422 to allow the drone 104 to rebroadcast signals to and from the roadside equipment 238 and/or the host vehicle 102, thereby increasing the communication capability of the host vehicle 102 by extending the communications range of the host vehicle 102.

The modes of the drone 104 may also be based on the status of the drone 104. For example, the drone 104 may only operate the range extender 422 in the flight mode. Suppose that the status module 224 reports that the drone 104 is in a low battery state, the drone 104 may conserve power by staying in an onboard mode. Additionally or alternatively, the drone 104 may only have predetermined functionalities in certain modes. For example, the drone 104 may only be capable of charging in an onboard mode, but be capable of using the drone sensors 210 in any mode.

Suppose that the first mode is a flight mode and the second mode is an onboard mode. The mode module 226 may identify the first mode based on the drone systems 208. For example, the flight system 232 may indicate that the drone 104 is in flight or is onboard the host vehicle 102. In another embodiment, the mode module 226 may identify the first mode based on the drone sensors 210. For example, the drone sensors 210 may indicate that the drone 104 is docked with the host vehicle 102. In yet another embodiment, the mode module may identify the first mode based on information from the status module 224. The drone 104 may also emit a signal indicative of the mode that is received by the mode module 226. The mode module 226 may also query the host vehicle 102 to identify whether the drone 104 is onboard the host vehicle 102.

At block 306, the method 300 includes the trigger module 228 generating a trigger signal based on an event. An event is a situation that changes a preferred operation of the drone 104. For example, the event may include one or more of the drone 104 being a threshold distance from the host vehicle 102, a predetermined time elapsing, a low battery determination, a recall request, and an environmental hazard. For example, suppose the drone 104 is monitoring the traffic scenario 100 in a first mode when the drone systems 208 indicate that the drone 208 has a low battery indication. The low battery indication is an event that indicates that the drone 104 may be better suited to a second mode, such as a charging mode, different than the first mode. Accordingly, the trigger signal may be generated based on the low battery indication. In one embodiment, the trigger signal may be received by the trigger module based on sensor data received by the drone 104, the host vehicle 102, and/or the remote server 202.

At block 308, the method 300 further includes the transition module 230 transmitting a transition signal configured to cause the drone to transition to the second mode that is associated with the second configuration. The transition signal may be received by the host vehicle 102 and/or the drone 104. The effect of the transition signal on the drone may be to cause the drone to assume a different mode associated with a different configuration. For example, suppose that the drone 104 is in a first mode that is a flight mode associated with an expanded configuration. Upon receiving the transition signal, the drone 104 may transition to a second mode that is an onboard mode associated with a retracted configuration.

The transition may include the drone executing a docking procedure with the host vehicle 102 or a takeoff procedure from the host vehicle 102. Continuing the example from above, suppose that the transition from the expanded configuration to the retracted configuration includes a docking procedure. The drone 104 may assume a relative position with the host vehicle 102. Moreover, the host vehicle 102 may transition in order to accommodate the drone 104. For example, the host vehicle 102 may receive the transition signal from the transition module 230 or the drone 104. In response to the transition signal, the host vehicle 102 may modify an aspect of the vehicle systems and/or a configuration of the host vehicle 102 based on the mode that the drone 104 is transitioning to.

Figure 5B:
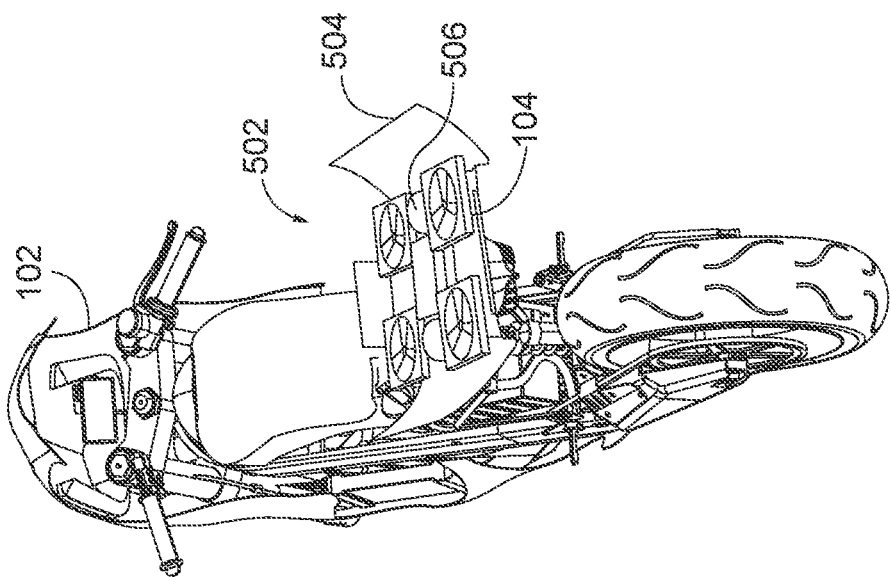
FIG. 5B is a model representation of the vehicle having a rear fairing approaching a closed state according to an exemplary embodiment.
Figure 5A:
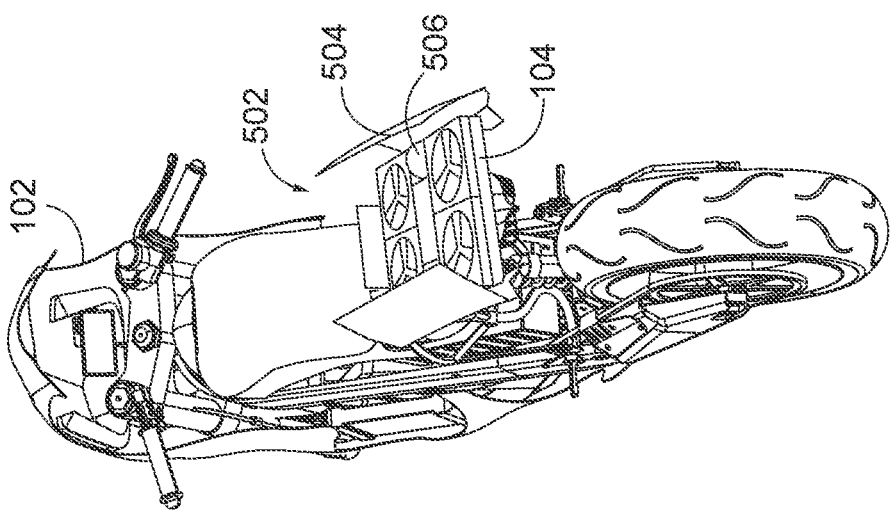
FIG. 5A is a model representation of the vehicle having a rear fairing approaching an open state according to an exemplary embodiment.

Suppose, the drone 104 docks at a rear fairing 502 of the host vehicle 102 as shown in FIGS. 5A and 5B. Suppose that the drone 104 has executed a docking procedure in response to the receiving the transition signal. The drone 104 may dock or takeoff from a rear fairing 502 of the host vehicle 102. The rear fairing 502 is one example, however, the drone 104 may dock with any portion of the host vehicle 102. Here, the rear fairing 502 may be a cavity within the rear of the host vehicle 102. In particular, the cavity may be formed by a first sidewall opposed by a second sidewall and separated by a base wall. One or more doors may be movably attached to the one or more of the sidewalls. A door 504 may be pivotally connected the first sidewall so as to pivot about a horizontal or vertical axis. For example, the door 504 may be hingedly attached to the sidewall.

The door 504 is configured to open or close based on the mode of the drone 104 without intervention by a vehicle occupant. For example, when the drone 104 is transitioning from the first configuration to the second configuration, the drone 104 may execute a docking procedure. During the docking procedure, the host vehicle 102 may cause the door 504 to open to an open state to allow the drone 104 to dock within the rear fairing 502. For example, the host vehicle 102 may receive the transition signal and open the door 504 as shown in FIG. 5A. In another embodiment, the door 504 may open automatically when the host vehicle detects the drone 104 within a predetermined proximity with the host vehicle 102.

The docking procedure may include the drone 104 emitting a docked signal. For example, the docked signal may be emitted in response to a drone sensor 210 being triggered. In one embodiment, the drone sensors 210 may include a pressure sensor 506 being triggered. The pressure sensor 506 may be triggered by the drone 104 assuming the second configuration, such as the retracted state. The pressure sensor may also be triggered by a feature of the host vehicle 102, such as a sidewall or door 504 of the rear fairing 502.

In response to the docked signal being received by the host vehicle 102, the host vehicle 102 may close the door 504 to a closed state, as shown in FIG. 5B. Accordingly, the host vehicle 102 and the drone 104 may operate cooperatively in response to the transmission of the transition signal at 308. As another example, suppose that the transition signal causes a take-off procedure to be executed by the drone 104. When the host vehicle 102 receives the transition signal, the pressure sensor 506 may detect that the door 504 is closed and emit a take-off signal to cause the host vehicle 102 may open the door 504 so that the drone can transition to the second configuration, in this example, an expanded configuration. Accordingly, the pressure sensor may facilitate the drone 104 detecting whether the door 504 is in an open state or a closed state. In another embodiment, the drone systems 208 and/or the drone sensors may detect whether the door 504 is in an open state or a closed state.

Figure 6:
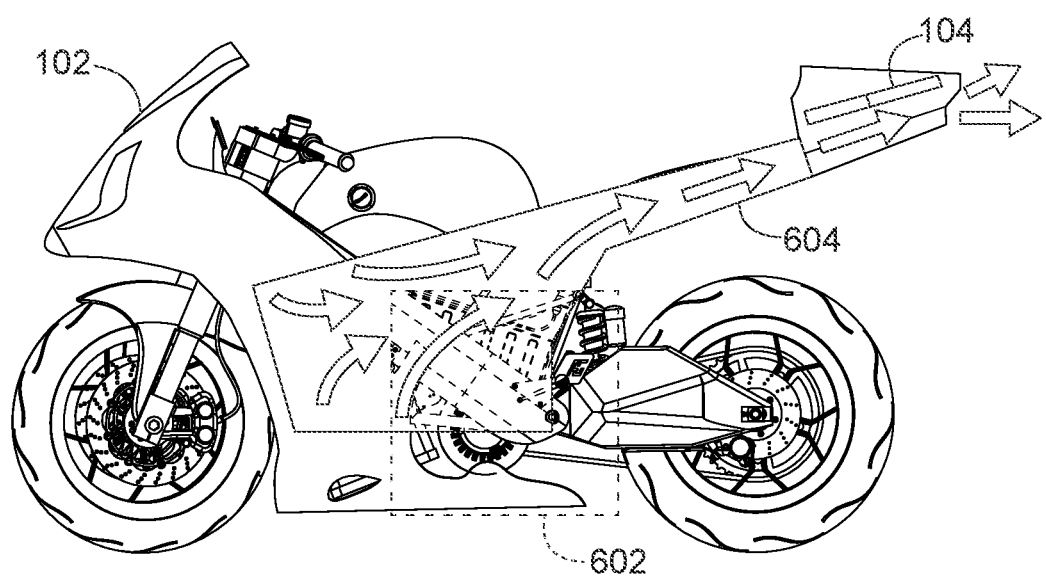
FIG. 6 is a cooling procedure for a vehicle compatible drone according to an exemplary embodiment.

In another embodiment, a cooling procedure may be initiated in response to the transition signal being transmitted at 308. For example, as shown in FIG. 6, the cooling procedure can be affected by the drone for the host vehicle 102. In the cooling procedure, the drone 104 may activate one or more of the drone systems 208 to cool the host vehicle. In one embodiment, one or more of the plurality of blades may be activated to draw heat away from the engine block 602 of the host vehicle 102 through airways such as the example airway 604. Therefore, the host vehicle 102 and the drone 104 may operate cooperatively regardless of the configuration of the drone. For example, the drone 104 may monitor the traffic scenario 100, provide communication capability, etc. in the first configuration and cool the engine block 602 in the second configuration. Furthermore, the drone 104 can change configuration to improve the functionality of the drone 104 and in this manner, the host vehicle 102 and the drone 104 are compatible. For example, in flight, the drone may assume an expanded configuration to support flight stability or a retracted configuration to facilitate the drone 104 being stored with the host vehicle 102. Accordingly, the drone 104 exhibits a plurality of configurations that provide corresponding functionalities to support the host vehicle 102.

As used in this application, the terms "component", "module," "system", "interface", and the like are generally intended to refer to a computer-related entity, either hardware, a combination of hardware and software, software, or software in execution. For example, a component may be, but is not limited to being, a process 4running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

The embodiments discussed herein may also be described and implemented in the context of computer-readable storage medium storing computer executable instructions. Computer-readable storage media includes computer storage media and communication media. For example, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, modules or other data. Computer-readable storage media excludes non-transitory tangible media and propagated data signals.

The invention claimed is:

1. A computer-implemented method for a vehicle-compatible drone that is compatible with a host vehicle, the computer-implemented method comprising:
   providing the vehicle-compatible drone that is compatible with the host vehicle having a plurality of blades and an expansion device, wherein the expansion device is adapted to reconfigure a position of at least one blade of the plurality of blades from a first configuration of the vehicle-compatible drone to a second configuration of the vehicle-compatible drone;
   identifying the vehicle-compatible drone being in a first mode, wherein the first mode is associated with the first configuration;
   detecting a trigger signal based on an event; and
   transmitting a transition signal configured to cause the vehicle-compatible drone to transition to a second mode that is associated with the second configuration, wherein, in the second configuration, at least one blade of the plurality of blades of the vehicle-compatible drone draws heat away from an engine block of the host vehicle.

2. The computer-implemented method of claim 1, wherein the first mode is a flight mode and in the first configuration the at least one blade of the plurality of blades is in an expanded position, and wherein the second mode is an onboard mode and in the second configuration the at least one blade of the plurality of blades is a retracted position.

3. The computer-implemented method of claim 1, wherein in the first mode, the computer-implemented method further comprises:
   receiving sensor data associated with an environment of the host vehicle from drone sensors of the vehicle-compatible drone.

4. The computer-implemented method of claim 3, wherein the sensor data identifies a remote vehicle and records a location associated with the remote vehicle.

5. The computer-implemented method of claim 1, wherein in the second mode, the computer-implemented method further comprises:
   detecting a state of a door in a fairing of the host vehicle, wherein the fairing is adapted to receive the vehicle-compatible drone in the second configuration, wherein the state of the door includes an open state and a closed state.

6. The computer-implemented method of claim 1, wherein the event includes one or more of the vehicle-compatible drone being a threshold distance from the host vehicle, a predetermined time elapsing, a low battery determination, a recall request, and an environmental hazard.

7. The computer-implemented method of claim 1, further comprising:
   deploying the vehicle-compatible drone to a position between roadside equipment and the host vehicle; and
   rebroadcasting signals to and from the roadside equipment or the host vehicle to increase communication capability.

8. The computer-implemented method of claim 1, further comprising:
   receiving physiological data associated with a vehicle occupant of the host vehicle from drone sensors of the vehicle-compatible drone; and
   contacting emergency services based on the physiological data.

9. A vehicle-compatible drone compatible with a host vehicle, the vehicle-compatible drone comprising:
a plurality of blades;
an expansion device adapted to reconfigure a position of at least one blade of the plurality of blades from a first configuration of the vehicle-compatible drone to a second configuration of the vehicle-compatible drone; and
a memory storing instructions when executed by a processor cause the processor to:
identifying the vehicle-compatible drone being in a first mode, wherein the first mode is associated with the first configuration;
detecting a trigger signal based on an event; and
transmitting a transition signal configured to cause the vehicle-compatible drone to transition to a second mode that is associated with the second configuration, wherein, in the second configuration, at least one blade of the plurality of blades of the vehicle-compatible drone draws heat away from an engine block of the host vehicle.

10. The vehicle-compatible drone of claim 9, wherein the first mode is a flight mode and in the first configuration the at least one blade of the plurality of blades is in an expanded position, and wherein the second mode is an onboard mode and in the second configuration the at least one blade of the plurality of blades is a retracted position.

11. The vehicle-compatible drone of claim 9, wherein the expansion device includes one or more of tracks adapted to slidably receive the at least one blade, a linkage mechanism adapted to reconfigure the at least one blade, and an expansion mandrel.

12. The vehicle-compatible drone of claim 9, further comprising:
at least one actuator controlled based on a command from the processor to position the vehicle-compatible drone in the first configuration or the second configuration.

13. The vehicle-compatible drone of claim 9, wherein the plurality of blades are configured to synchronously transition from the first configuration to the second configuration.

14. The vehicle-compatible drone of claim 9, further comprising a range extender to provide communication capability to the host vehicle.

15. A non-transitory computer readable storage medium storing instructions that, when executed by a computer, which includes at least a processor, causes the computer to perform a method for a vehicle-compatible drone that is compatible with a host vehicle, the method comprising:
providing the vehicle-compatible drone having a plurality of blades and an expansion device, wherein the expansion device is adapted to reconfigure a position of at least one blade of the plurality of blades from a first configuration of the vehicle-compatible drone to a second configuration of the vehicle-compatible drone;
identifying the vehicle-compatible drone being in a first mode, wherein the first mode is associated with the first configuration;
detecting a trigger signal based on an event; and
transmitting a transition signal configured to cause the vehicle-compatible drone to transition to a second mode that is associated with the second configuration, wherein, in the second configuration, at least one blade of the plurality of blades of the vehicle-compatible drone draws heat away from an engine block of the host vehicle.

16. The non-transitory computer readable storage medium of claim 15, wherein the first mode is a flight mode and in the first configuration the at least one blade of the plurality of blades is in an expanded position, and wherein the second mode is an onboard mode and in the second configuration the at least one blade of the plurality of blades is a retracted position.

17. The non-transitory computer readable storage medium of claim 15, wherein in the second mode, the method further comprises:
detecting a state of a door in a fairing of the host vehicle, wherein the fairing is adapted to receive the vehicle-compatible drone in the second configuration, and wherein the state of the door includes an open state and a closed state.

18. The non-transitory computer readable storage medium of claim 15, further comprising:
receiving an out-of-range alert for the host vehicle with respect to a remote network;
deploying the vehicle-compatible drone to an area within a communication range of the host vehicle and the remote network; and
initializing a range extender on the vehicle-compatible drone to enable communications of the host vehicle using the remote network.

* * * * *